(12) United States Patent
Brucker et al.

(10) Patent No.: US 10,250,586 B2
(45) Date of Patent: Apr. 2, 2019

(54) SECURITY CERTIFICATION AND APPLICATION CATEGORIZATION FOR MOBILE DEVICE MANAGEMENT

(71) Applicant: SAP SE, Walldorf (DE)

(72) Inventors: Achim D. Brucker, Sheffield (GB); Michael Herzberg, Moeglingen (DE)

(73) Assignee: SAP SE, Walldorf (DE)

( * ) Notice: Subject to any disclaimer, the term of this patent is extended or adjusted under 35 U.S.C. 154(b) by 250 days.

(21) Appl. No.: 14/962,590

(22) Filed: Dec. 8, 2015

(65) Prior Publication Data

US 2017/0163631 A1 Jun. 8, 2017

(51) Int. Cl.
*H04L 29/06* (2006.01)
*H04W 12/08* (2009.01)

(52) U.S. Cl.
CPC ........ *H04L 63/0823* (2013.01); *H04L 63/101* (2013.01); *H04W 12/08* (2013.01)

(58) Field of Classification Search
CPC ... H04L 63/0823; H04L 63/101; H04W 12/08
See application file for complete search history.

(56) References Cited

U.S. PATENT DOCUMENTS

| 8,473,505 | B2 | 6/2013 | Brucker et al. |
| 8,881,293 | B1 | 11/2014 | Brucker et al. |
| 8,959,646 | B2 | 2/2015 | Brucker et al. |
| 9,106,666 | B2 * | 8/2015 | Omar ..................... H04L 63/102 |
| 9,195,841 | B2 | 11/2015 | Cras et al. |
| 9,258,669 | B2 * | 2/2016 | Nyisztor ............... H04L 41/082 |
| 9,781,146 | B2 * | 10/2017 | Sridhar ............... H04L 63/1433 |
| 2011/0314261 | A1 | 12/2011 | Brucker et al. |
| 2013/0078948 | A1 * | 3/2013 | Pecen ................. H04L 63/0823 |
| | | | 455/411 |

(Continued)

OTHER PUBLICATIONS

"How to Deal with Third Party Apps in a Privacy System—The PMP Gatekeeper—" Christoph Stach 2015 16th IEEE International Conference on Mobile Data Management Year: 2015, vol. 1.*

(Continued)

*Primary Examiner* — Shanto Abedin
*Assistant Examiner* — Sameera Wickramasuriya
(74) *Attorney, Agent, or Firm* — Fish & Richardson P.C.

(57) ABSTRACT

Implementations for managing mobile devices associated with enterprise operations include actions of receiving a request to access information regarding a mobile application for download to and installation on a mobile device of a user, the request including an enterprise identifier, receiving a tenant-specific configuration based on the identifier, the tenant-specific configuration including criteria for mobile applications to be available for download to and installation on mobile devices associated with the enterprise, transmitting a request for a list of available mobile applications to an application and certification database, the request including the tenant-specific configuration, receiving the list of available mobile applications, which includes a subset of mobile applications of a superset of mobile applications, the subset of mobile applications being provided based on the tenant-specific configuration, and providing graphical representations of each mobile application in the list of available mobile applications for display to the user.

20 Claims, 7 Drawing Sheets

(56) References Cited

U.S. PATENT DOCUMENTS

| | | | | |
|---|---|---|---|---|
| 2013/0081114 A1* | 3/2013 | Bell | ............. | H04L 63/0846 |
| | | | | 726/5 |
| 2013/0097659 A1* | 4/2013 | Das | ............. | G06F 21/629 |
| | | | | 726/1 |
| 2013/0205366 A1* | 8/2013 | Luna | ............. | H04L 63/101 |
| | | | | 726/1 |
| 2013/0267199 A1* | 10/2013 | Kamal | ............. | H04L 63/0853 |
| | | | | 455/410 |
| 2013/0340048 A1* | 12/2013 | Sebastian | ............. | H04L 63/08 |
| | | | | 726/4 |
| 2014/0068697 A1 | 3/2014 | Brucker et al. | | |
| 2014/0289859 A1* | 9/2014 | Archer | ............. | G06F 21/577 |
| | | | | 726/25 |
| 2015/0133094 A1* | 5/2015 | Lindeman | ............. | H04W 4/001 |
| | | | | 455/414.1 |

OTHER PUBLICATIONS

A. Shabtai, Y. Fledel, U. Kanonov, Y. Elovici, S. Dolev and C. Glezer, "Google Android: A Comprehensive Security Assessment," in IEEE Security & Privacy, vol. 8, No. 2, pp. 35-44, Mar.-Apr. 2010. (Year: 2010).*

Peng, Hao, et al. "Using probabilistic generative models for ranking risks of android apps." Proceedings of the 2012 ACM conference on Computer and communications security. ACM, 2012. (Year: 2012).*

* cited by examiner

Expensetastic!

Number of downloads: 1764

A mobile application that makes it easy for business travelers to capture receipts and voice notes, and to organize, track and submit business expenses from their smartphones.

- Create expense entries as they happen
- Send expense entries and attachments to the back-office system
- Capture receipt photos, and record voice notes for expenses
- This application is powered by Neatbase Platform read more Privacy and Security Information:

| | |
|---|---|
| 4.0 | Certification level: bronze<br>Expert judgment: 2/5 (10)<br>User judgment: 3/5 (5) | Required critical permissions:<br>Complete network access<br>  5% of users do not expect this permission<br>Location access (GPS)<br>  60% of users expect this permission |

Pricing

Customer Reviews

[Download]

*FIG. 2*

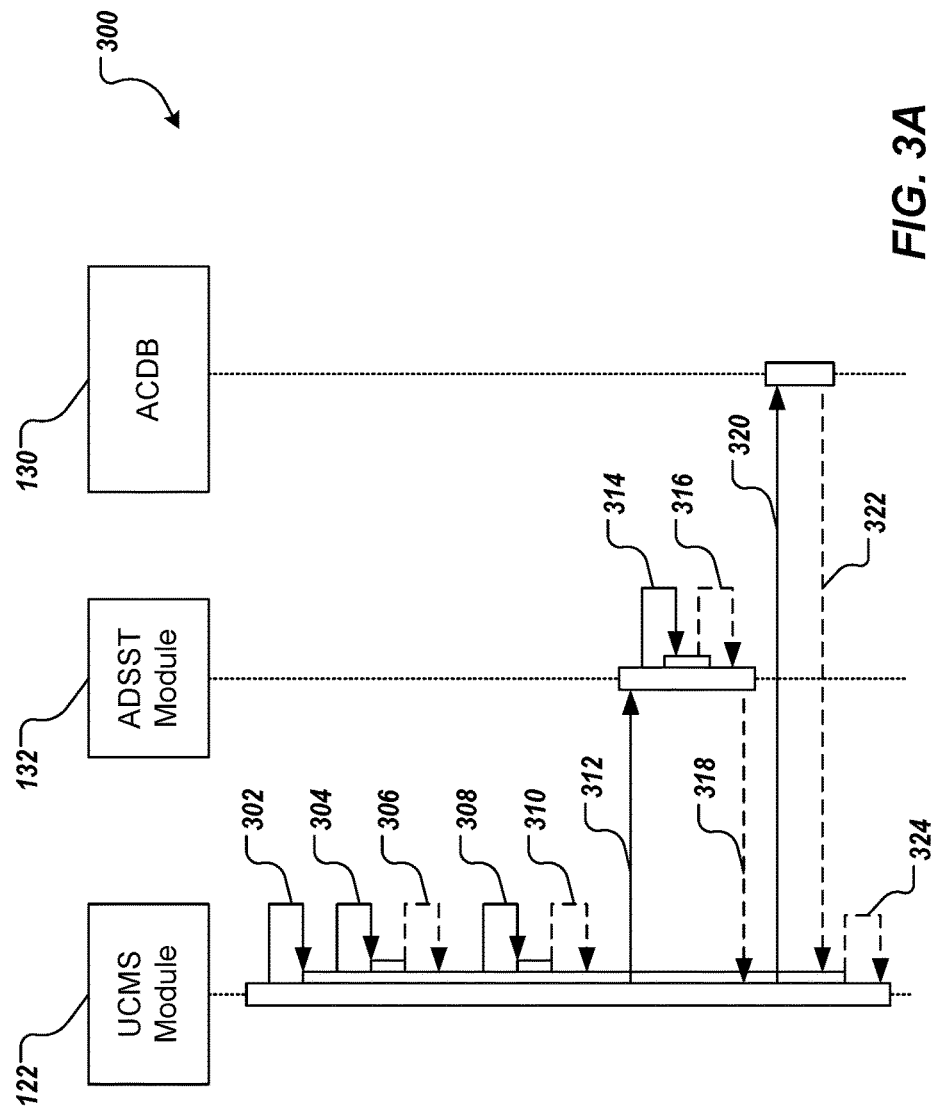

SECURITY CERTIFICATION AND APPLICATION CATEGORIZATION FOR MOBILE DEVICE MANAGEMENT

BACKGROUND

Enterprise operations are often executed across a range of users, software, and devices. Increasingly, enterprise operations are at least partially executed on mobile devices (e.g., smartphones, tablets). This trend is often referred to as the "mobile first" strategy. Consequently, an increasing number of enterprises are supporting a bring your own device (BYOD) strategy, in which employees use their own, personal devices to perform work-related tasks. In some instances, enterprises provide mobile device to their employees (or at least a portion of their employees).

In view of security threats (e.g., malicious users trying to hack into enterprises), enterprises need to carefully select which mobile applications can be installed on a device that is also used for enterprise operations. Here, neither a manual white-listing approach (e.g., explicitly specifying which mobile applications employees are allowed to install) nor a manual black-listing approach (e.g., explicitly specifying which mobile applications employees are not allowed to install) is not practical possible. For example, the sheer number of mobile applications released per day, results in white-lists being always too restrictive, and black-lists being outdated (and, thus, not effectively blocking insecure mobile applications). The effort for updating both black-lists and white-lists is extremely high, which reduces their business value even more.

In view of this, a solution is required that enables enterprise users to install all "harmless" (from a security perspective) mobile applications (e.g., mobile applications that do not endanger the security or privacy of the business data) from application stores (so-called "app stores").

SUMMARY

Implementations of the present disclosure are directed to managing mobile devices associated with enterprise operations. In some implementations, actions include receiving a request to access information regarding at least one mobile application for download to and installation on a mobile device of a user, the request including an identifier associated with an enterprise, receiving a tenant-specific configuration based on the identifier, the tenant-specific configuration including criteria for mobile applications to be available for download to and installation on mobile devices associated with the enterprise, transmitting a request for a list of available mobile applications to an application and certification database, the request including the tenant-specific configuration, receiving the list of available mobile applications, which includes a subset of mobile applications of a superset of mobile applications, the subset of mobile applications being provided based on the tenant-specific configuration, and providing graphical representations of each mobile application in the list of available mobile applications for display to the user. Other implementations of this aspect include corresponding systems, apparatus, and computer programs, configured to perform the actions of the methods, encoded on computer storage devices.

These and other implementations can each optionally include one or more of the following features: actions further include receiving at least one criteria from an administrator of the enterprise, the at least one criteria defining a constraint to mobile applications that can be downloaded to and installed on mobile devices associated with the enterprise, and providing the tenant-specific configuration for the enterprise, the tenant-specific configuration being stored in a tenant configuration database and indexed to the enterprise based on the identifier; the superset of mobile applications includes mobile applications that are available for download from an application store; the subset of mobile applications includes mobile applications that are included in the superset of mobile applications, and that meet at least one criteria of the tenant-specific configuration; actions further include receiving a mobile application from an application developer, the mobile application to be included in the superset of mobile applications, requesting at least one certification from a third-party certification service based on the mobile application, receiving the certification as a computer-readable file from the third-part certification service, and storing the mobile application and the certification in the application and certification database; actions further include providing the mobile application to a testing module, the testing module performing one or more of static application security testing (SAST) and dynamic application security testing (DAST) on the mobile application, and providing test results, and storing the test results with the mobile application in the application and certification database; and actions further include receiving a user selection of a mobile application from the list of mobile applications, and, at least partially in response, retrieving an application file of the mobile application from the application and certification database, and transmitting the application file to the mobile device of the user for installation of the mobile application thereon.

Implementations of the present disclosure provide one or more advantages. For example, the security of (mobile) devices that allow users to install applications (software) is improved as the enterprise can effectively rule-out insecure (non-trustworthy) applications. In more detail, implementations of the present disclosure enable users of mobile devices, based on a potential pre-selection by administrators (experts) from their enterprise or mobile provider, to select and install applications that fulfill the security and/or privacy requirements of their enterprise (employer) or mobile provider. This guarantee of security and/or privacy requirements before deployment provides for a reduced number of runtime checks, security and/or privacy enforcements on the device and, thus, increases the performance (e.g., processing, memory) and battery lifetime of the mobile device as well as decreases the memory footprint of the security software on the device. Further, costs associated with the selection of secure and privacy-aware applications are reduced, and, at the same time, the attractiveness of (partly) company controlled devices (e.g., BYOD or company devices) is increased as the number of applications available to users is increased.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

FIG. 2 depicts an example screenshot of an application store in accordance with implementations of the present disclosure.

FIGS. 3A-3C depict example sequence diagrams in accordance with implementations of the present disclosure.

Like reference symbols in the various drawings indicate like elements.

DETAILED DESCRIPTION

Figure 1:
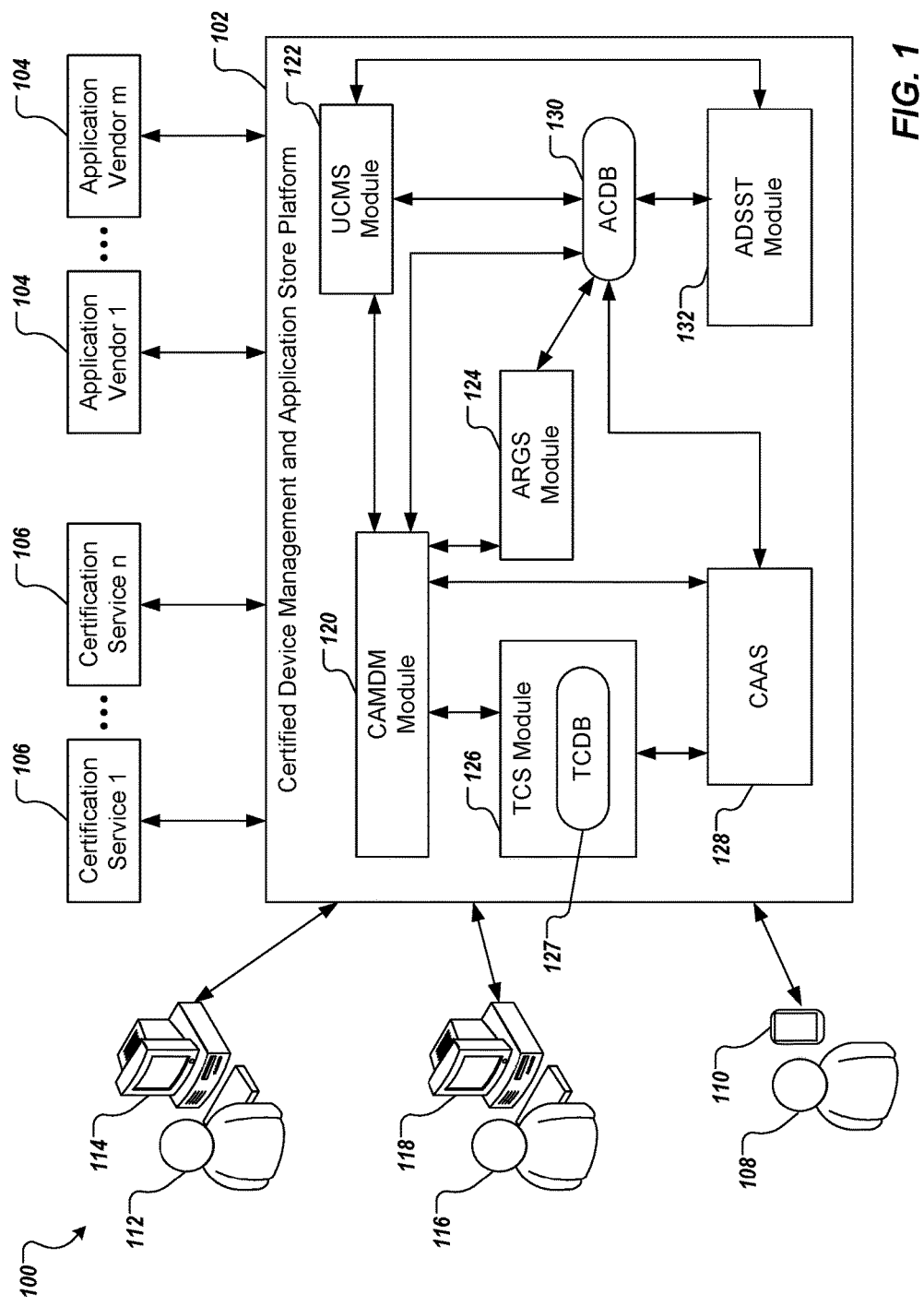
FIG. 1 depicts an example system architecture for executing implementations of the present disclosure.

Implementations of the present disclosure are generally directed to mobile device management (MDM) and application markets (also called app markets). More particularly, implementations of the present disclosure are directed to a platform that can be used by multiple enterprises to control which mobile applications can be downloaded to mobile devices of users associated with respective enterprises. In some implementations, and as described herein, an enterprise can provide a tenant-specific configuration within the platform, which defines criteria for mobile applications that can be downloaded to and installed on mobile devices associated with the enterprise. In some implementations, users (e.g., employees of the enterprise) access an application marketplace (e.g., "app store") to select and download mobile applications. In some examples, the mobile applications made available to the user for download are constrained based on the tenant-specific configuration of the respective enterprise.

As introduced above, enterprises are increasingly relying on mobile on mobile devices (e.g., smartphones, tablets) for the execution (or at least partial execution) of enterprise operations. This trend is often referred to as the "mobile first" strategy. Consequently, an increasing number of enterprises are supporting a bring your own device (BYOD) strategy, and/or providing mobile devices to employees. The increased reliance on mobile devices for enterprise operations requires higher security standards for those devices. For example, because an insecure mobile application can harm the security of the mobile device itself, enterprises need to carefully control which mobile applications employees can install on their mobile devices (e.g., mobile devices that handle critical data).

As also introduced above, controlling the mobile applications that can be installed on a mobile device poses a significant challenge. On the one hand, allowing only approved mobile applications would make the mobile device increasingly secure. On the other hand, only allowing approved mobile applications kills employee incentive for using a mobile device for work-related purposes (e.g., fewer employees accepting work "on the road"). In some cases, users may circumvent systems that block them from interesting mobile applications, and install them anyway, and, thus, endangering the enterprise.

In view of at least the foregoing, enterprises need to carefully select which mobile applications can be installed on a mobile device that is also used for enterprise purposes. Here, neither a manual white-listing approach (e.g., explicitly specifying which mobile applications employees are allowed to install) nor a manual black-listing approach (e.g., explicitly specifying which mobile applications employees are not allowed to install) is not practical possible. For example, the sheer number of mobile applications released per day (e.g., upwards of over 1000 mobile applications released to an application store in a single day), results in white-lists being always too restrictive, and black-lists being outdated (and, thus, not effectively blocking insecure mobile applications). The effort for updating both black-lists and white-lists is extremely high, which reduces their business value even more.

In view of the foregoing, and as described in further detail herein, implementations of the present disclosure are directed to a MDM platform that applies automatic certification and categorization of mobile applications. More particularly, implementations of the present disclosure provide an end-to-end (from the application developer to the mobile device) solution that addresses the challenges of deploying mobile applications securely in enterprises. As described herein, implementations of the present disclosure integrate different resources for assessing the security, privacy-awareness, and trustworthiness of a mobile application. Example resources include certification of mobile applications by third parties (e.g., in collaboration with the application developer), and automated static and dynamic tests of the mobile application within the platform.

In some implementations, mobile applications are ranked according to their security, privacy-awareness, and/or trustworthiness. In some examples, the ranking is based on application type (e.g., security requirements can depend on the functionality to be performed by the mobile application), the vendor of the mobile application (e.g., trusted vendors, unknown vendors), enterprise-specific requirements (e.g., requirements for a whole enterprise that supports mobile workers), and user-specific and/or role-specific requirement (e.g., different policies for employees in sales roles than employees in development roles). In some examples, by using automated assessments and integrating existing certification(s), implementations of the present disclosure avoid the time-consuming and expensive process of defining explicit white-lists and/or black-lists.

As described herein, implementations of the present disclosure integrate various resources that provide evidence for the security, privacy, and/or trustworthiness to provide a uniform, user-specific, and application-specific ranking of mobile applications. In some examples, this ranking is used, within the platform of the present disclosure, to support administrators in (semi-) automatically defining enterprise-specific and/or employee-specific policies for MDM (e.g., only mobile applications that meet group specific ranking criterion can be installed on a mobile device, and/or to offer company-specific and/or employee-specific application stores that enable employees to select from a range of mobile applications that comply with policies of the enterprise.

FIG. 1 depicts an example system architecture 100 for executing implementations of the present disclosure. In the depicted example, the systems architecture includes a certified device management and application store (CDMAS) platform 102, that can be used by one or more application vendors 104 (e.g., developers that offer mobile applications), and one or more certification services 106 (e.g., third-party certification authorities that certify mobile applications and provide respective certificates in computer-readable form) to provide mobile applications, as described herein. In some examples, the CDMAS platform 102 is provided by one or more computer-executable programs executed by one or more computing devices. For example, the CDMAS platform 102 can be hosted using one or more server systems, and can be accessible by computing devices over a network (not shown). An example network can include a public communication network (e.g., the Internet, cellular data network, dialup modems over a telephone network), a wide area network (WAN), a local area network (LAN), a private communications network (e.g., private LAN, leased lines), or any appropriate combination thereof.

In accordance with implementations of the present disclosure, and as described in further detail herein the CDMAS platform 102 can provide one or more mobile applications to a user 108 (e.g., an employee of an enterprise) of a mobile device 110, in accordance with implementations of the present disclosure. In some examples, the mobile device 110 communicates with the CDMAS platform 102 over the network. Using the mobile device 110, the user 108 can download and install a mobile application to the mobile device 110, which mobile application can be used by the user to perform enterprise tasks.

In some implementations, an administrator 112 (e.g., an employee of the enterprise having an administrator role) can interact with the CDMAS platform 102 using a computing device 114. In some implementations, a marketplace user 116 (e.g., a user accessing the app market from a desktop computer using a web browser to search for new apps, browse apps based on the ranked categories such as their security or privacy ranking, install new apps on the mobile device or to delete/manage already installed apps) can interact with the CDMAS platform 102 using a computing device 118. Example interactions of the administrator 112 and the marketplace user 116 are described herein.

In the depicted example, the CDMAS platform 102 includes a certification-aware mobile device management (CAMDM) module 120, an update and certificate management service (UCMS) module 122, an application ranking and grouping service (ARGS) module 125, a tenant configuration service (TCS) module 126 having a tenant configuration database 127, a certification-aware application store (CAAS) 128 (e.g., marketplace), an application and certification database (ACDB) 130, and an automated dynamic and static security testing (ADSST) module 132.

In some implementations, the UCMS module 122 offers the overall management of certified mobile applications within the CDMAS platform 102. In some examples, the UCMS module 122 regularly queries (depending on the service offering, either in a subscription or pulling mode) the certification services 106 to obtain new certificates for newly published mobile applications, or updates certificates of existing applications, and obtains updates to revoked certificates. In some examples, the UCMS module 122 combines a certificate and the respective mobile application (e.g., certified application) into a single package, and stores the package in the ACDB 130. In some examples, the UCMS module 122 provides create, read, update, delete (e.g., CRUD) interfaces, as well as dedicated query interfaces to the CAMDM module 120.

In some implementations, the CAMDM module 120 is provided as an extension of a MDM solution that support certificates. For example, the CAMDM module 120 enables administrators (e.g., the administrator 112) to perform a variety of operations. Example operations include: selecting mobile applications that are pushed automatically on mobile devices based on the security certificates and local security tests; selecting mobile applications that are offered for self-service installation through an application store based on security certificates and local security tests; classifying mobile applications based on security certificates and local security tests (e.g., as applications that are allowed to access company data, as applications that are allowed to be installed on company devices or employee-owned (BYOD) devices that may be restricted to only access non-company data on the device; configuring selection based on multiple (ranked) criteria such as the security/privacy level of applications, category (e.g., business, travel, etc.) of applications, vendors of applications, and the like; and black-list and/or white-list applications to implement manual exceptions to the automated selection criteria (either individual applications or based on selection criteria, e.g., the application vendor).

In some implementations, the ADST module 132 provides a fully automated test service that uses static application security testing (SAST) and/or dynamic application (DAST) to assess the security of a mobile application. In some examples, SAST includes an analysis technique for statically analyzing program code to detect potential problems within the source code of the mobile application. That is, SAST performs such analysis without actually executing (running) the mobile application. Potential problems with the code can include, for example, potentially insecure dataflows that can endanger either the security of safety of the program. In some examples, a test result of SAST can include whether the mobile application has potential security risks, and, if so, a level of the risk. In some examples, DAST includes an analysis technique for dynamically analyzing program code to detect potential problems within the source code of the mobile application. That is, DAST performs such analysis by actually executing (running) the mobile application, or at least a portion of the mobile application. In some examples, a test result of DAST can include whether the mobile application has potential security risks, and, if so, a level of the risk. In some implementations, testing may also include the analysis of insecure configurations in the mobile applications and/or unencrypted access to network services.

In some implementations, the ARGS module 124 performs the multi-criteria ranking and grouping that is used by the CAMDM module 120. In some examples, the ARGS module 124 uses the UCMS Module 122 to obtain unified security and privacy information (e.g., provided by zero or more certification services and/or the ADSST module 132) for all available apps. The security and privacy information is a multi-dimensional set of properties where some properties might be orderable. Depending on the user request, the ARGS module 124 ranks (sorts) the apps according to one or more criteria selected by a user. In some implementations, the apps can be grouped by one or multiple criteria (e.g., apps with the properties (or similar properties that only differ by a defined threshold) are put into the same group).

In some implementations, the TCS module 126 provides CRUD operations for the per-tenant (e.g., per enterprise) configuration that is used by both the CAMDM module 120 and the CAAS 128 to serve multiple tenants. In some examples, a tenant is a client of the CDMAS platform 102 (e.g., an enterprise that uses the CDMAS platform). In some implementations, the TCDB 126 stores per-tenant configurations (i.e., tenant-specific configurations).

In some implementations, the CAAS 128 is provided as an application store, or an extension to a third-party application store. In some examples, the CAAS 128 provides mobile applications that satisfy defined criteria, and provides the certification information for display to end users (e.g., the user 108) to empower users to decide whether they want to take the security risk of installing a particular mobile application.

FIG. 2 depicts an example screenshot 200 of an application store in accordance with implementations of the present disclosure. For example, the user 108 can use the mobile device 110 to access the CAAS 128, which provides the example screenshot 200 for display to the user 108 on the mobile device 110. In the depicted example, information associated with a fictional mobile application "Expensetastic!" (e.g., a mobile application for tracking and recording travel expenses) is displayed in the screenshot. In accordance with implementations of the present disclosure, privacy and security information 202 is provided. In some examples, the privacy and security information is stored with the mobile application in and is provided from the ACDB 130. The user is able to review the privacy and security information in making a decision as to whether to download and install the mobile application.

Figure 3B:
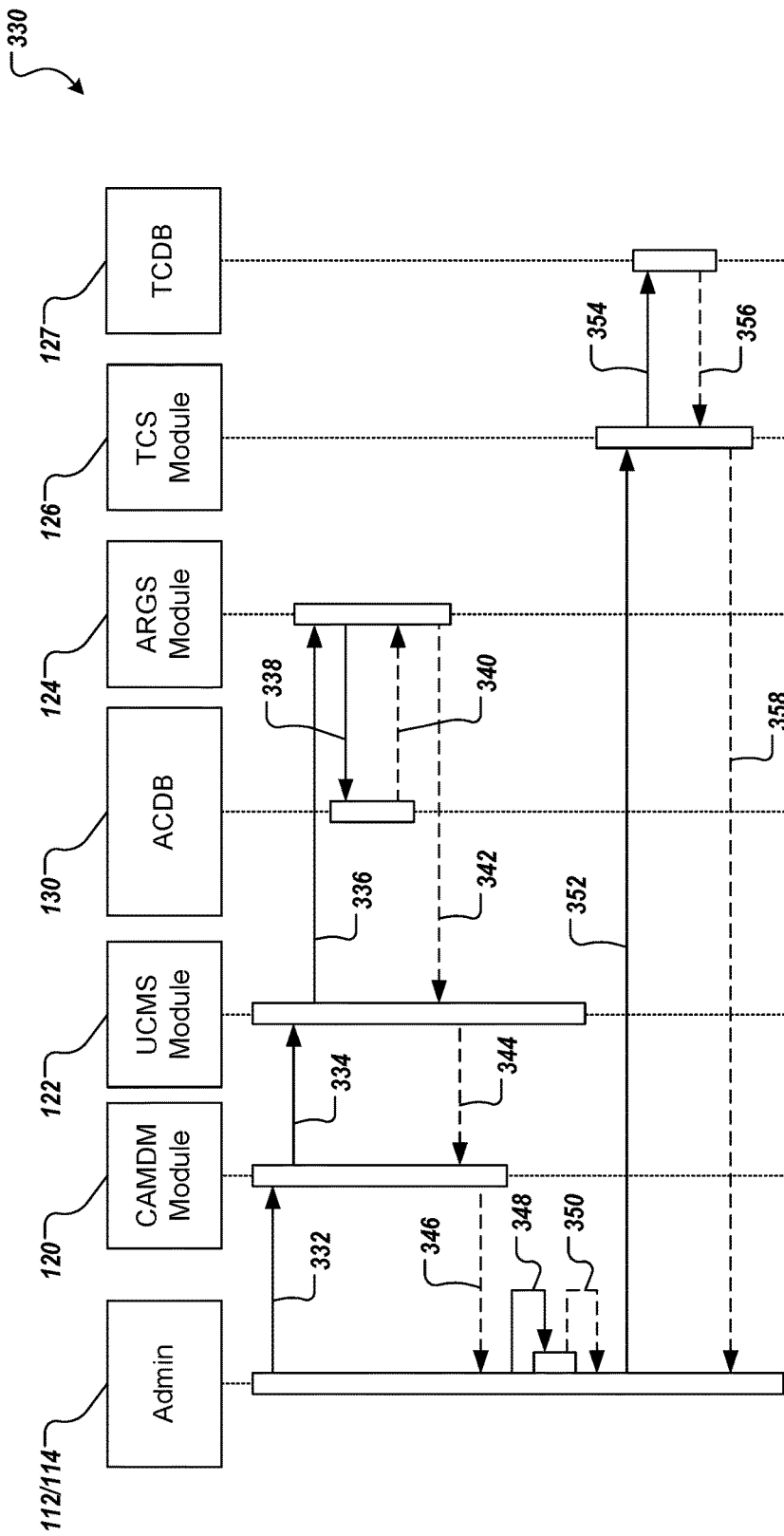
Figure 3C:
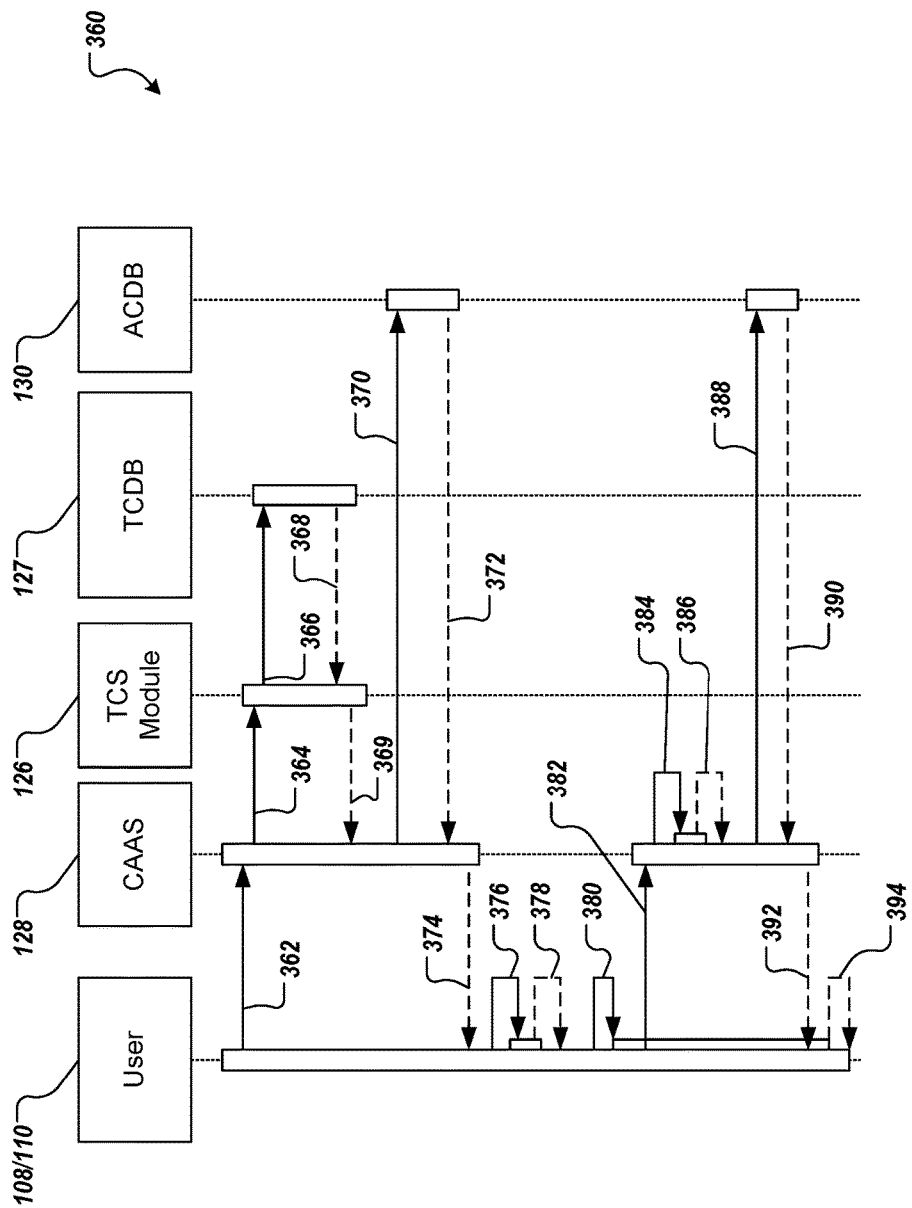

Implementations of the present disclosure will be described in further detail herein with reference to example use cases. A first example use case includes a system administrator (e.g., the administrator 112) configuring the CDMAS platform 102 to enable employees of a respective enterprise to download mobile applications from the CAAS 128. A second example use case includes an end user (e.g., the user 108) accessing the CAAS 128 using a device (e.g., the mobile device 110). The example user cases will also be described with reference to FIGS. 3A-3C, which respectively depict example sequence diagrams 300, 330, 360 in accordance with implementations of the present disclosure. The sequence diagrams 300, 330, 360 depict example communications between components of the system architecture 100 of FIG. 1 in accordance with implementations of the present disclosure. The sequence diagram 300 of FIG. 3A is directed to updating a list of mobile applications that are available from the CDMAS platform 102. The sequence diagram 330 of FIG. 3B is directed to configuration of a mobile application list for a specific tenant (e.g., enterprise). The sequence diagram 360 of FIG. 3C is directed to installation of an application to a mobile device from the CAAS 128.

With regard to the first example use case, an administrator (e.g., the administrator 116) is employed by a particular enterprise and is responsible for managing mobile devices (e.g., company-owned devices, BYOD devices) that may have access to enterprise data, and/or otherwise be used to perform work-related tasks for the particular enterprise. The administrator interacts with the CDMAS platform 102 to provide a configuration for the enterprise (a tenant-specific configuration).

With particular reference to FIG. 3A, actions of the sequence diagram 300 are performed to update a list of mobile applications provided from the CDMAS platform 102. In the depicted example, the UCMS 122 module triggers (302) an update application list task. For example, the UCMS 122 can trigger the task in response to a notification from an application vendor 104 (e.g., a new application is to be made available through the CDMAS platform 102), in response to a notification from a certification service 106 (e.g., a certification is being provided for an application), or on a regular interval (e.g., once every hour). In some examples, the UCMS module 122 queries (304) application vendors 104 for new or updates to applications, and receives (306) corresponding responses. In some examples, the UCMS module 122 queries (308) certification services 106 for new or updated certificates, and receives (310) corresponding responses.

In some examples, if a new or updated application is to be provided, the CDMAS platform 102 performs one or more tests on the application and/or certificates. For example, the ADSST132 receives (312) an application file (e.g., source code, compiled code) and/or a certificate file, performs testing (314) (e.g., SAST, DAST), and provides (316) test result data. In some examples, the application file is provided to the UCMS 122 from a respective application vendor 104. In some examples, the certificate file is provided to the UCMS 122 from a respective certification service 106. The ADSST module 132 sends (318) the test result data to the UCMS module 122. In some examples, the test result data indicates whether the application and/or certification meets specified security and/or quality standards. The UCMS module 122 stores (320) the application and/or certificate, and test results in the ACDB 130. In some examples, only applications and/or certificates that meet the specified security and/or quality standards are stored. In some examples, information about the application (e.g., certificates and test results), as well as the application itself (e.g., computer-executable code) are stored. The ACDB 130 confirms (322) storage, and the UCMS 122 updates (324) the list of applications that are available for download through the CDMAS platform 102.

In some implementations, the list of applications that are available for download through the CDMAS platform 102 is provided as a computer-readable file. In some examples, for each application in the list of applications, a data set is provided, the data set providing information associated with a respective application. In some examples, the data set includes one or more certifications associated with the application. In some examples, the data set includes the title of the application, the application vendor, an abstract of the application, a list of application features, and the like.

With particular reference to FIG. 3B, actions of the sequence diagram 330 are performed to provide an enterprise-specific configuration. In some examples, the administrator 112, using the computing device 114, accesses (332) the CAMDM module 120 to provide a configuration that defines mobile applications that should be available to employees of a respective enterprise. For example, the administrator 112 can log into a web portal that enable the administrator 112 to interact with the CAMDM module 120 through one or more UIs. In some examples, the administrator 112 can provide one or more criteria to the CAMDM module 120. Example criteria can include minimum certification (e.g., one or more certifications and/or level of certification (gold, silver, bronze) an application must have to be available to employees of the enterprise, application catergor(y/ies) (e.g., budgeting, travel, timekeeping), data access restrictions (e.g., limitations on the level of enterprise data an application is able to have access to), and the like.

In some examples, the CAMDM module 120 sends (334) a request to the UCMS module 122 in response to input provided from the administrator 112. In some examples, the request includes a request for a configured application list, and includes the one or more criteria provided by the administrator 112. In response to the request, the UCMS module 122 sends (336) a ranking/grouping request to the ARGS module 124, which ranks and/or groups the available applications (i.e., applications available from the CDMAS platform 102) based on the criteria provided by the administrator 112. In some examples, the ARGS module 124 queries (338) and receives (340) a response from the ACDB 130. For example, the ARGS module 124 can query the ACDB 130 for a list of applications that meet one or more of the criteria. The ARGS module 124 provides (342) a ranked list of applications to the UCMS module 122, which provides (344), the ranked list of applications to the CAMDM module 120, which provides (346) the ranked list of applications to the administrator 114 (e.g., displays the ranked list of applications within a UI). In some examples, the administrator 112 modifies (348), (350) the ranked list of applications to provide a tenant-specific configuration (e.g., list of applications) for the particular enterprise. For example, the administrator 112 can remove one or more applications provided in the ranked list of applications. In some examples, the administrator 112 can use a white-list (e.g., applications the administrator 112 already knows are approved for use by employees) to confirm applications in the ranked list of applications as allowable for employees to download. In some examples, the administrator 112 can use a black-list (e.g., applications the administrator 112 already knows are not approved for use by employees) to remove applications from the ranked list of applications. In some examples, the administrator 112 can update the criteria used to provide the ranked list of applications.

Through this process, providing a ranked list of applications based on criteria provided by the administrator 112, and validation of applications in the ranked list of applications (e.g., the administrator indicating approval of specific applications and/or disapproval of specific applications), and/or modifications to selection criteria, the tenant-specific configuration is provided. In some examples, and as described in further detail herein, the tenant-specific configuration is accessed to provide a list of applications to an employee of an enterprise (the enterprise associated with the tenant-specific configuration). In some implementations, the administrator 112 provides (352) the tenant-specific configuration to the TCS module 126, which stores (354) the tenant-specific configuration in the TCDB (127), the TCDB 127 providing (356) confirmation of storage to the TCS module 126, which provides (358) confirmation of storage to the administrator 112. In some examples, the tenant-specific configuration is associated with an identifier of the enterprise. In some examples, the identifier is unique to the enterprise and distinguishes the enterprise from other enterprises that use the CDMAS platform 102.

With particular reference to FIG. 3C, a user 108, using a computing device 110, can interact with the CDMAS platform 102 to view and download (or update) mobile applications approved by the enterprise that the user 108 is associated with (e.g., is an employee of). In some examples, the user 108 accesses (362) the CAAS 128. For example, the user 108 logs into the CAAS 128 using previously established credentials (e.g., username, password) that are associated with a particular enterprise. As another example, the user 108 logs into the CAAS 128 using previously established credentials (e.g., username, password), then selects an enterprise (e.g., the user's employer) from a list of enterprises the user is associated with.

In some implementations, the CAAS 128 requests (364) the tenant-specific configuration of the enterprise from the TCS module 126. In some examples, the TCS module 126 queries (366) the TCDB 127 based on the identifier associated with the enterprise, and the TCDB 126 provides (368) the tenant-specific configuration associated with the respective enterprise to the TCS module 126, which provides (369) the tenant-specific configuration to the CAAS 128. The CAAS 128 requests (370) a list of available applications from the ACDB 130 based on the tenant-specific configuration. The ACDB 130 provides (372) a list of available applications based on the tenant-specific configuration to the CAAS 128, which provides (374) the list of available applications to the user 108. For example, the CAAS 128 can cause the list of available applications to be displayed to the user 108 on the device 110. In some examples, a catalogue of available applications can be displayed to the user 108 (e.g., applications organized by type, launch date, category, application vendor, certification(s), etc.).

In some implementations, the user 108 browses (376) the catalogue of available applications, and selects (378) an application. In some examples, the user 108 can select an application by clicking on the application within the catalogue. In some examples, and in response to user selection of the application, a detailed description of the application can be displayed (e.g., the example screenshot 200 of FIG. 2). In some implementations, the user 108 indicates (380) that an application is to be downloaded to and installed on the device 110. In some examples, in response to the user indication, the device 110 sends (382) a request to the CAAS 128. The CAAS 128 checks (384) the policy underlying the user's access to the application. In some examples, if the application conforms to the policy (e.g., a tenant-specific list of apps that the user is allowed to install), the CAAS 128 confirms (386) that the user is allowed to download and install the requested application. In some examples, by checking the policy, it can be confirmed whether the user is attempting to bypass the system (e.g., confirming that the to-be-installed application is actually included in the list of allowed applications). In some examples, if the application does not conform to the policy, the CAAS 128 confirms (386) that the user is not allowed to download and install the requested application.

If the user is allowed to download and install the application, the CAAS 128 sends (388) a request for the application file from the ACDB 130, and the ACDB 130 sends (390) the application file to the CAAS 128. The CAAS 128 sends (392) the application file to the device 110, which installs (394) the application on the device 110 using the application file.

Figure 4:
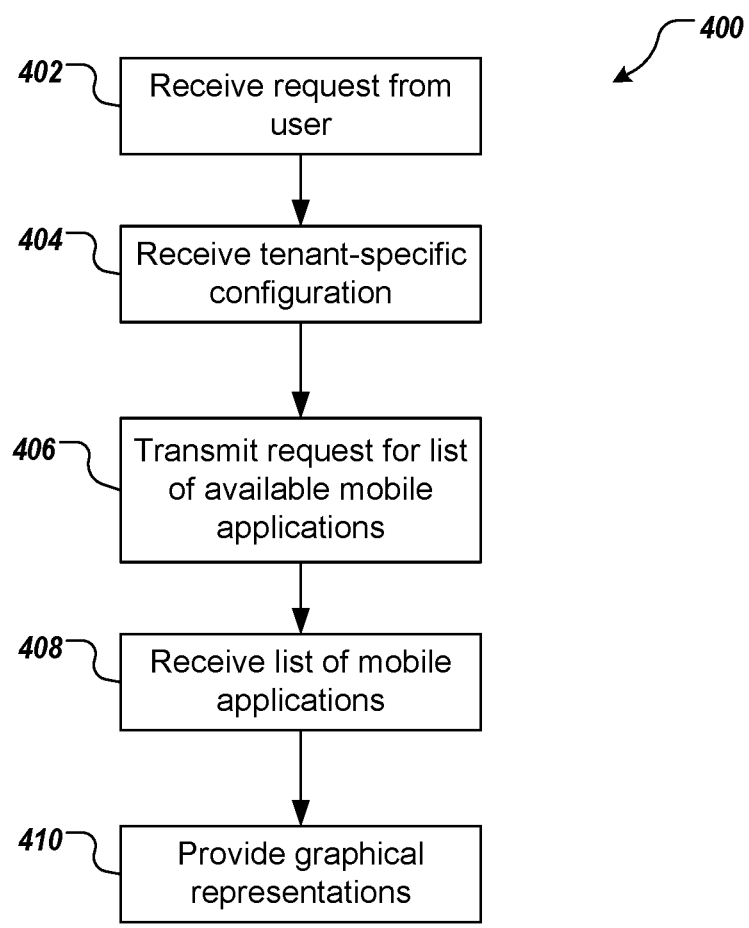
FIG. 4 is a flowchart illustrating an example process that can be executed in implementations of the present disclosure.

FIG. 4 is a flowchart illustrating an example process 400 that can be executed in implementations of the present disclosure. In some implementations, the example process 400 can be realized using one or more computer-executable programs that are executed using one or more computing devices. In some examples, the example process 400 is performed to manage mobile devices associated with enterprise operations. In some examples, a mobile device associated with enterprise operations is a mobile device that is used by a user (employee) of an enterprise, and that may at least partially perform one or more enterprise operations, and/or have access to enterprise data.

A request is received from a user (402). For example, a request to access information regarding at least one mobile application for download to and installation on a mobile device of a user is received. In some examples, the request includes an identifier associated with an enterprise. With reference to FIG. 1, the user 108 transmits the request using the mobile device 110 to the CAAS 128. A tenant-specific configuration is received (404). In some examples, the tenant-specific configuration is provided based on the identifier, and includes criteria for mobile applications to be available for download to and installation on mobile devices associated with the enterprise. With reference to FIG. 1, the CAAS 128 requests the tenant-specific configuration from the TCS module 126, which retrieves the tenant-specific configuration from the TCDB 127 based on the identifier.

A request for a list of available mobile applications is transmitted (406). For example, the request is transmitted to an application and certification database, and includes the tenant-specific configuration. With reference to FIG. 1, the CAAS 128 transmits the request to the ACDB 130, which provides the list of available mobile applications. The list of available mobile applications is received (408). In some examples, the list of available mobile applications is provide as a subset of mobile applications of a superset of mobile applications, the subset of mobile applications being provided based on the tenant-specific configuration. With reference to FIG. 1, the CAAS 128 receives the list of available mobile applications from the ACDB 130, the list of available mobile applications including less than all of the mobile applications stored in the ACDB 130. Graphical representations of each mobile application in the list of available mobile applications are provided for display to the user (410).

Figure 5:
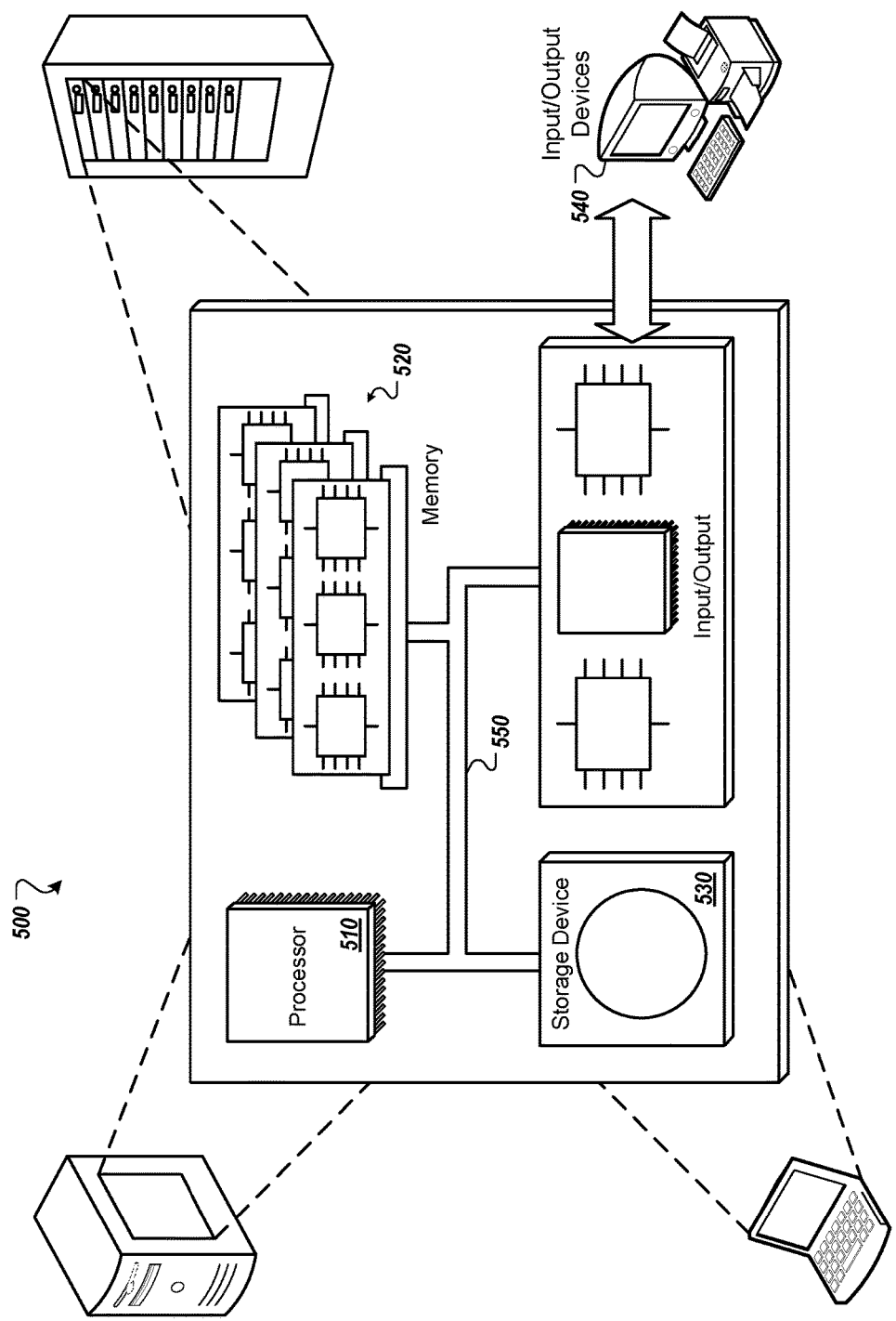
FIG. 5 is a schematic illustration of example computer systems that can be used to execute implementations of the present disclosure.

FIG. 5 is a schematic illustration of example computer systems 500 that can be used to execute implementations of the present disclosure. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for managing mobile devices associated with enterprise operations, the method being executed using one or more processors and comprising:

receiving, by the one or more processors, a request to access information regarding at least one mobile application for download to and installation on a mobile device of a user, the request comprising an identifier associated with an enterprise, the identifier being unique to the enterprise and distinguishing the enterprise from other enterprises;

receiving, by the one or more processors, a tenant-specific configuration based on the identifier, the tenant-specific configuration comprising a plurality of criteria for mobile applications to be available for download to and installation on mobile devices associated with the enterprise, at least one of the plurality of criteria being associated with vendors of the mobile applications that are independent from the enterprise;

transmitting, by the one or more processors, a request for a list of available mobile applications to an application and certification database, the request comprising the tenant-specific configuration;

receiving, by the one or more processors, the list of available mobile applications, which comprises a subset of mobile applications of a superset of mobile applications, the subset of mobile applications being provided based on the tenant-specific configuration by using automated assessments and integrating an existing certification;

providing, by the one or more processors, graphical representations of each mobile application in the list of available mobile applications for display to the user, the graphical representations being ranked based on at least two different criteria that are selected by the user of the mobile device, the list of available mobile applications further grouped according to the at least two different criteria, at least one of the criteria being a risk of installing each mobile application; and installing, by the one or more processors and on the mobile device of the user, a mobile application selected from the list of available mobile applications.

2. The method of claim 1, further comprising:

receiving, by the one or more processors, at least one criterion from an administrator of the enterprise, the at least one criterion defining a constraint to mobile applications that can be downloaded to and installed on mobile devices associated with the enterprise; and providing, by the one or more processors, the tenant-specific configuration for the enterprise, the tenant-specific configuration being stored in a tenant configuration database and indexed to the enterprise based on the identifier.

3. The method of claim 1, wherein the superset of mobile applications comprises mobile applications that are available for download from an application store.

4. The method of claim 1, wherein the subset of mobile applications comprises mobile applications that are included in the superset of mobile applications, and that meet at least one criterion of the tenant-specific configuration.

5. The method of claim 1, further comprising:

receiving, by the one or more processors, a new mobile application from an application developer, the new mobile application to be included in the superset of mobile applications;

requesting, by the one or more processors, at least one certification from a third-party certification service based on the new mobile application;

receiving, by the one or more processors, the certification as a computer-readable file from the third-party certification service; and storing, by the one or more processors, the new mobile application and the certification in the application and certification database.

6. The method of claim 5, further comprising:

providing, by the one or more processors, the new mobile application to a testing module, the testing module performing one or more of static application security testing (SAST) and dynamic application security testing (DAST) on the new mobile application, and providing test results; and storing, by the one or more processors, the test results with the new mobile application in the application and certification database.

7. The method of claim 1, further comprising receiving a user selection of the mobile application from the list of mobile applications, and, at least partially in response to:

retrieving an application file of the mobile application from the application and certification database; and transmitting the application file to the mobile device of the user for installation of the mobile application thereon.

8. A non-transitory computer-readable storage medium coupled to one or more processors and having instructions stored thereon which, when executed by the one or more processors, cause the one or more processors to perform operations for managing mobile devices associated with enterprise operations, the operations comprising:

receiving a request to access information regarding at least one mobile application for download to and installation on a mobile device of a user, the request comprising an identifier associated with an enterprise, the identifier being unique to the enterprise and distinguishing the enterprise from other enterprises;

receiving a tenant-specific configuration based on the identifier, the tenant-specific configuration comprising a plurality of criteria for mobile applications to be available for download to and installation on mobile devices associated with the enterprise, at least one of the plurality of criteria being associated with vendors of the mobile applications that are independent from the enterprise;

transmitting a request for a list of available mobile applications to an application and certification database, the request comprising the tenant-specific configuration;

receiving the list of available mobile applications, which comprises a subset of mobile applications of a superset of mobile applications, the subset of mobile applications being provided based on the tenant-specific configuration by using automated assessments and integrating an existing certification;

providing graphical representations of each mobile application in the list of available mobile applications for display to the user, the graphical representations being ranked based on at least two different criteria that are selected by the user of the mobile device, the list of available mobile applications further grouped according to the at least two different criteria, at least one of the criteria being a risk of installing each mobile application; and installing, on the mobile device of the user, a mobile application selected from the list of available mobile applications.

9. The computer-readable storage medium of claim 8, wherein operations further comprise:

receiving at least one criterion from an administrator of the enterprise, the at least one criterion defining a constraint to mobile applications that can be downloaded to and installed on mobile devices associated with the enterprise; and providing the tenant-specific configuration for the enterprise, the tenant-specific configuration being stored in a tenant configuration database and indexed to the enterprise based on the identifier.

10. The computer-readable storage medium of claim 8, wherein the superset of mobile applications comprises mobile applications that are available for download from an application store.

11. The computer-readable storage medium of claim 8, wherein the subset of mobile applications comprises mobile applications that are included in the superset of mobile applications, and that meet at least one criterion of the tenant-specific configuration.

12. The computer-readable storage medium of claim 8, wherein operations further comprise:

receiving a new mobile application from an application developer, the new mobile application to be included in the superset of mobile applications;

requesting at least one certification from a third-party certification service based on the new mobile application;

receiving the certification as a computer-readable file from the third-party certification service; and storing the new mobile application and the certification in the application and certification database.

13. The computer-readable storage medium of claim 12, wherein operations further comprise:

providing the new mobile application to a testing module, the testing module performing one or more of static application security testing (SAST) and dynamic application security testing (DAST) on the new mobile application, and providing test results; and storing the test results with the new mobile application in the application and certification database.

14. The computer-readable storage medium of claim 8, wherein operations further comprise receiving a user selection of the mobile application from the list of mobile applications, and, at least partially in response to:

retrieving an application file of the mobile application from the application and certification database; and transmitting the application file to the mobile device of the user for installation of the mobile application thereon.

15. A system, comprising:
a computing device; and a computer-readable storage device coupled to the computing device and having instructions stored thereon which, when executed by the computing device, cause the computing device to perform operations for managing mobile devices associated with enterprise operations, the operations comprising:

receiving a request to access information regarding at least one mobile application for download to and installation on a mobile device of a user, the request comprising an identifier associated with an enterprise, the identifier being unique to the enterprise and distinguishing the enterprise from other enterprises;

receiving a tenant-specific configuration based on the identifier, the tenant-specific configuration comprising a plurality of criteria for mobile applications to be available for download to and installation on mobile devices associated with the enterprise, at least one of the plurality of criteria being associated with vendors of the mobile applications that are independent from the enterprise;

transmitting a request for a list of available mobile applications to an application and certification database, the request comprising the tenant-specific configuration;

receiving the list of available mobile applications, which comprises a subset of mobile applications of a superset of mobile applications, the subset of mobile applications being provided based on the tenant-specific configuration by using automated assessments and integrating an existing certification;

providing graphical representations of each mobile application in the list of available mobile applications for display to the user, the graphical representations being ranked based on at least two different criteria that are selected by the user of the mobile device, the list of available mobile applications further grouped according to the at least two different criteria, at least one of the criteria being a risk of installing each mobile application; and installing, on the mobile device of the user, a mobile application selected from the list of available mobile applications.

16. The system of claim 15, wherein operations further comprise:

receiving at least one criterion from an administrator of the enterprise, the at least one criterion defining a constraint to mobile applications that can be downloaded to and installed on mobile devices associated with the enterprise; and providing the tenant-specific configuration for the enterprise, the tenant-specific configuration being stored in a tenant configuration database and indexed to the enterprise based on the identifier.

17. The system of claim 15, wherein the superset of mobile applications comprises mobile applications that are available for download from an application store.

18. The system of claim 15, wherein the subset of mobile applications comprises mobile applications that are included in the superset of mobile applications, and that meet at least one criterion of the tenant-specific configuration.

19. The system of claim 15, wherein operations further comprise:

receiving a new mobile application from an application developer, the new mobile application to be included in the superset of mobile applications;

requesting at least one certification from a third-party certification service based on the new mobile application;

receiving the certification as a computer-readable file from the third-party certification service; and storing the new mobile application and the certification in the application and certification database.

20. The system of claim 19, wherein operations further comprise:

providing the new mobile application to a testing module, the testing module performing one or more of static application security testing (SAST) and dynamic application security testing (DAST) on the new mobile application, and providing test results; and storing the test results with the new mobile application in the application and certification database.

* * * * *